H. HILL.
Hand Seed-Sower.
No. 224,909. Patented Feb. 24, 1880.
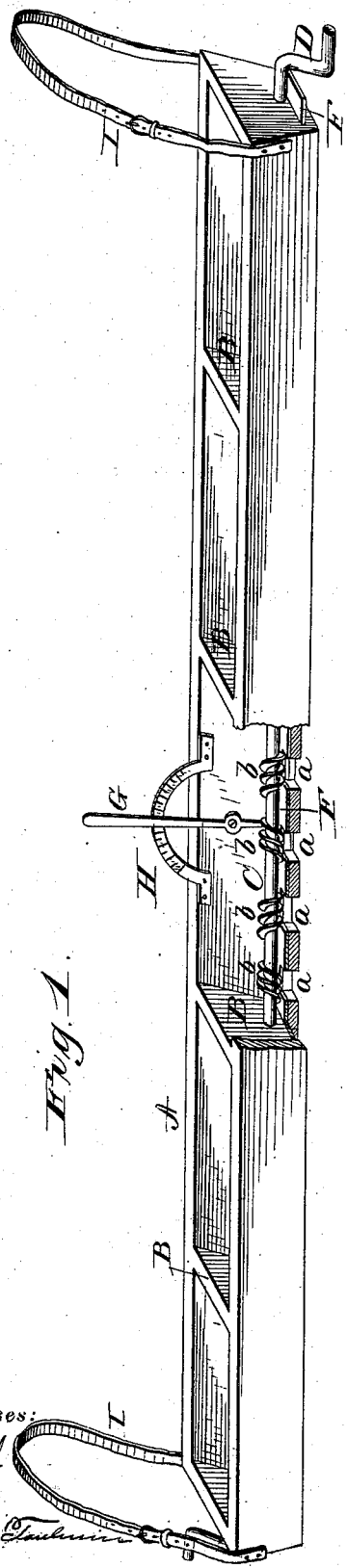
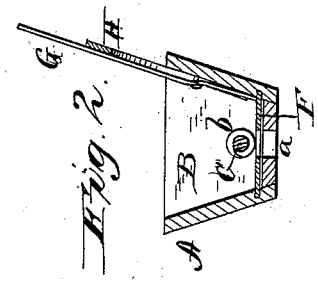

UNITED STATES PATENT OFFICE.

HENRY HILL, OF FREEDOM, PENNSYLVANIA.

HAND SEED-SOWER.

SPECIFICATION forming part of Letters Patent No. 224,909, dated February 24, 1880.

Application filed December 29, 1879.

*To all whom it may concern:*

Be it known that I, HENRY HILL, of Freedom, in the county of Beaver, and in the State of Pennsylvania, have invented certain new and useful Improvements in Hand Seed-Sowers; and I do hereby declare that the following is a full, clear, and exact description thereof, reference being had to the accompanying drawings, and to the letters of reference marked thereon, making a part of this specification.

The nature of my invention consists in the construction and arrangement of a hand seed-sower, as will be hereinafter more fully set forth.

In order to enable others skilled in the art to which my invention appertains to make and use the same, I will now proceed to describe its construction and operation, referring to the annexed drawings, in which—

Figure 1 is a perspective view of my hand seed-sower, partly in section, and Fig. 2 is a transverse vertical section of the same.

A represents a narrow box, about sixteen feet long, more or less, and divided by partitions B into any number of chambers desired. The bottom of the box is slotted, as shown, to form seed-openings $a$.

C is a shaft running longitudinally through the box, and provided with a crank, D, at each end. On this shaft are attached or formed separate and independent distributing-worms $b\ b$ directly over the slots $a$ in the bottom of the box, said worms being alternately right and left hand. Between the shaft C and the bottom of the box is a slotted slide, F, for regulating the amount of seed sown, said slide being operated by a pivoted lever, G. H is a gage to set the lever by. I I are straps at each end of the box.

The object of the separated right and left hand worms is to prevent the seed from working to either end of the box or the several compartments therein, so as to keep the seed distributed evenly along the bottoms of said compartments. If there were a continuous worm, the seed would all work to one end of the box.

The machine is carried by a man at each end, having the strap I across his shoulder. After the amount of seed sown to the acre has been determined, the lever G is set to the proper place on the gage H. The machine being filled with seed, the men start in a straight line forward over the ground to be sown. The man on the right gives the crank one turn to every step taken. When they get to the end of the field, instead of turning the machine around, the men simply face about and then move the machine up the length of itself. They then start on their return across the field, the man on the right following the track made by the man on the left, and so on until the field has all been passed over.

Having thus fully described my invention, what I claim as new, and desire to secure by Letters Patent, is—

A hand seeding-machine consisting of a long narrow box having two or more compartments provided with seed-openings in their bottoms, regulated by suitable slides, said box being provided with neck-straps at each end and with a longitudinal crank-shaft, upon which are a series of alternate but separate right and left hand worms, substantially as and for the purposes herein set forth.

In testimony that I claim the foregoing I have hereunto set my hand this 22d day of December, 1879.

HENRY HILL.

Witnesses:
 ADAM HILL,
 DAVID E. LOWRY.